US012810489B2

(12) United States Patent
Nakamura

(10) Patent No.: US 12,810,489 B2
(45) Date of Patent: Nov. 24, 2026

(54) INFORMATION PROCESSING DEVICE AND INFORMATION PROCESSING METHOD

(71) Applicant: CANON KABUSHIKI KAISHA, Tokyo (JP)

(72) Inventor: Tomonori Nakamura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 18/435,894

(22) Filed: Feb. 7, 2024

(65) Prior Publication Data

US 2024/0282017 A1 Aug. 22, 2024

(30) Foreign Application Priority Data

Feb. 16, 2023 (JP) ................................ 2023-022712

(51) Int. Cl.
*G06T 11/00* (2026.01)
*G10L 21/057* (2013.01)
*G10L 25/51* (2013.01)

(52) U.S. Cl.
CPC ............ *G06T 11/00* (2013.01); *G10L 21/057* (2013.01); *G10L 25/51* (2013.01); *G06T 2200/24* (2013.01)

(58) Field of Classification Search
None
See application file for complete search history.

(56) References Cited

U.S. PATENT DOCUMENTS

2006/0098639 A1 5/2006 Sakai
2014/0222437 A1* 8/2014 Burton .............. H04M 1/72403 704/278
2019/0394057 A1* 12/2019 Bujnowski ............. G06Q 10/06
2021/0373843 A1* 12/2021 Hornsby ................ H04N 5/278
2021/0407158 A1 12/2021 Sen
2022/0103941 A1* 3/2022 Vautrin ............ H04N 21/43615
2022/0109707 A1* 4/2022 Butterfield ........... G06Q 10/103
2022/0385491 A1* 12/2022 Morris ................ H04L 12/1822
2023/0017111 A1* 1/2023 Chhabra ................. H04S 3/008
2024/0147178 A1* 5/2024 Clavel ........................ H04S 7/30
2024/0214454 A1* 6/2024 Singh ....................... G06F 3/011

FOREIGN PATENT DOCUMENTS

JP 2002232576 A 8/2002
JP 2018186366 A 11/2018
JP 2022136589 A 9/2022

* cited by examiner

*Primary Examiner* — Kyle Zhai
(74) *Attorney, Agent, or Firm* — Canon U.S.A., Inc. IP Division

(57) ABSTRACT

An information processing device determines a priority sound data item from among a plurality of sound data items of which sound generation timings overlap each other and which are directed at an avatar of a first user in a virtual space. The information processing device performs control to notify the first user of contents of the priority sound data item by reproducing the priority sound data item at a first timing. The information processing device performs control to notify the first user of contents of a non-priority sound data item without reproducing the non-priority sound data item at the first timing. The non-priority sound data item is not determined to be the priority sound data item from among the plurality of sound data items, without reproducing the non-priority sound data item at the first timing.

20 Claims, 8 Drawing Sheets

INFORMATION PROCESSING DEVICE AND INFORMATION PROCESSING METHOD

BACKGROUND

Technical Field

The present disclosure relates to an information processing device and an information processing method.

Description of the Related Art

A user can wear an HMD (Head Mounted Display) and communicate through his or her own alter ego, i.e., an avatar, in a virtual space using a VR (Virtual Reality) technology. For the communication in a state where the HMD is worn, voice chat or the like is used.

Japanese Patent Application Publication No. 2018-186366 discloses a technology in which, in communication using voice, sound data is converted into text data, and the text data resulting from the conversion is displayed in time series on an HMD. According to this technology, when timings of utterance from a plurality of participants to a specific avatar overlap each other, even if the participant corresponding to the specific avatar misses what was stated by a given participant, the user can understand what was stated.

Meanwhile, there may be a case where it is easier to ascertain the intent of a statement or the like intuitively when what is stated is reported by voice, which includes elements such as a manner of saying and a tone of voice, rather than by text display. However, it may be possible that, while participating in a presentation in a virtual space, when a participant among the audience is spoken to by another participant next thereto, voices of both the presentation presenter and the next participant are mixed, and the voices of both of these cannot sufficiently be heard.

SUMMARY

An object of the present disclosure is to provide a technology which allows, when sounds from a plurality of sound sources are directed at an avatar in a virtual space, a user, who controls the avatar, to appropriately recognize contents of the sounds.

An aspect of the present disclosure is an information processing device including at least one memory storing instructions; and at least one processor that, upon execution of the stored instructions, is configured to function as: a determination unit configured to determine a priority sound data item from among a plurality of sound data items of which sound generation timings overlap each other and which are directed at an avatar of a first user in a virtual space; a first control unit configured to perform control to notify the first user of contents of the priority sound data item by reproducing the priority sound data item at a first timing; and a second control unit configured to perform control to notify the first user of contents of a non-priority sound data item without reproducing the non-priority sound data item at the first timing, wherein the non-priority sound data item is not determined to be the priority sound data item from among the plurality of sound data items.

An aspect of the present disclosure is an information processing method including: determining a priority sound data item from among a plurality of sound data items of which sound generation timings overlap each other and which are directed at an avatar of a first user in a virtual space; performing control to notify the first user of contents of the priority sound data item by reproducing the priority sound data item at a first timing; and performing control to notify the first user of contents of a non-priority sound data item without reproducing the non-priority sound data item at the first timing, wherein the non-priority sound data item is not determined to be the priority sound data item from among the plurality of sound data items.

Further features of the present disclosure will become apparent from the following description of exemplary embodiments with reference to the attached drawings.

DESCRIPTION OF THE EMBODIMENTS

Referring to the accompanying drawings, embodiments will be described below. In addition, numerical values, processing timings, a processing order, a subject of processing, a data (information) transmission destination/transmission source/storage location and the like, which are used in the embodiments described below, are given as an example for the purpose of specific explanation, and it is not intended to limit these to such an example.

First Embodiment

Figure 1A:
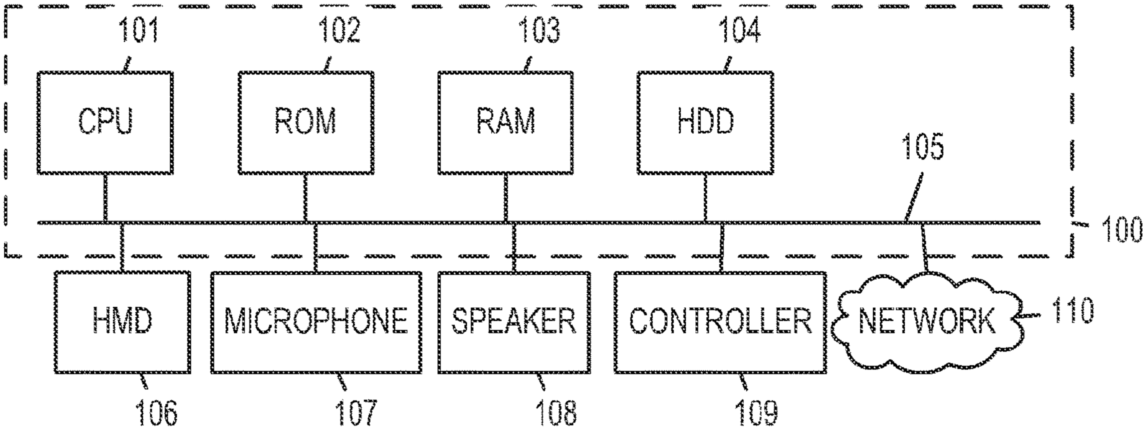
FIG. 1A is a diagram illustrating a user terminal.
Figure 1B:
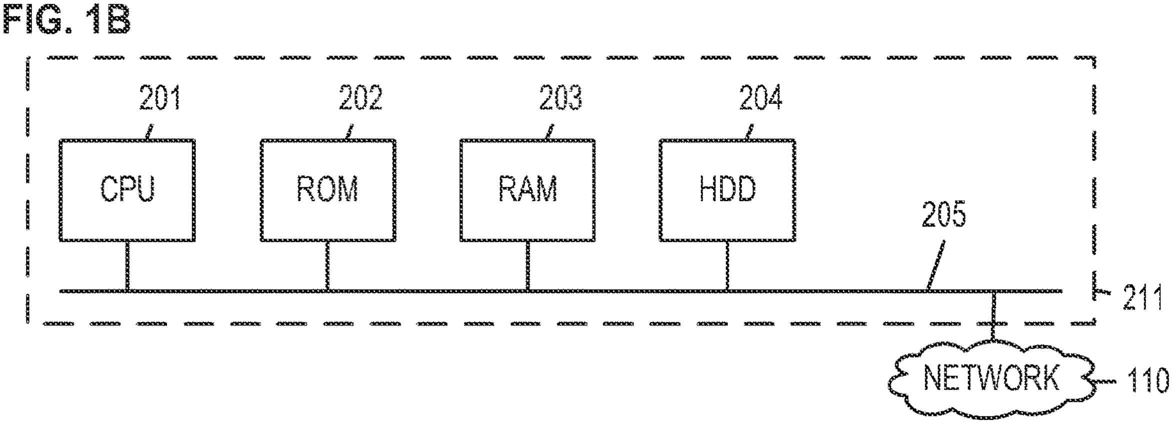
FIG. 1B is a diagram illustrating a server.
Figure 1C:
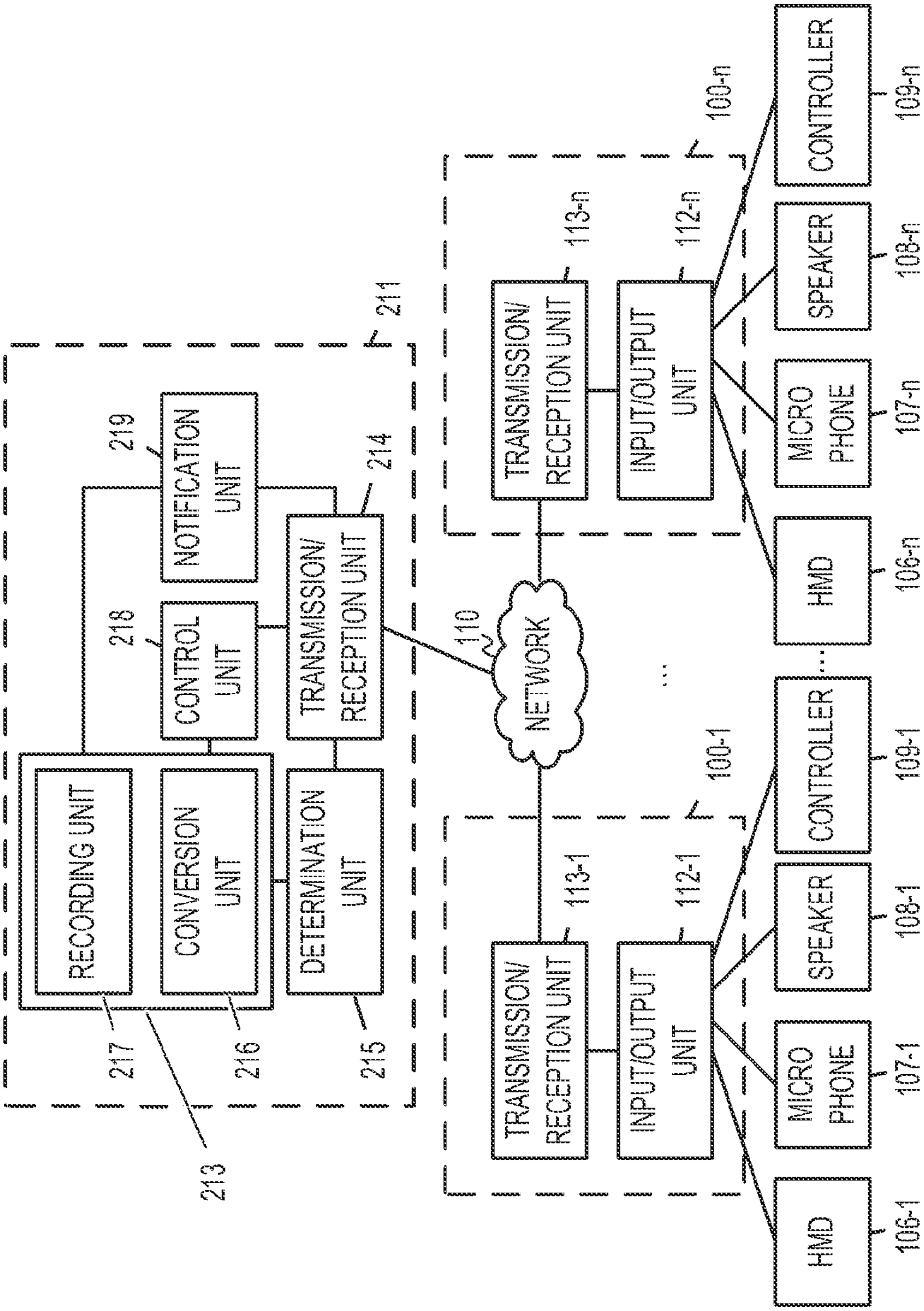
FIG. 1C is a diagram illustrating the user terminal and the server.

FIGS. 1A to 1C are block diagrams illustrating an example of configurations of a user terminal 100 and a server 211 according to the first embodiment. FIG. 1A illustrates an example of a hardware configuration of the user terminal 100. The user terminal 100 has a CPU (Central Processing Unit) 101 and a ROM (Read-Only memory) 102. The user terminal 100 has a RAM (Random Access Memory) 103 and a HDD (Hard Disk Drive) 104. These configurations are connected to be communicative with each other via a bus 105.

The CPU 101 uses a program and data which are stored in the RAM 103 or the ROM 102 to perform various processing. Thus, the CPU 101 controls an overall operation of the user terminal 100, while performing or controlling various processing, which will be described as processing to be performed by the user terminal 100.

The ROM 102 stores therein setting data, a program, data, and the like. The RAM 103 has an area for storing a computer program or data (a computer program or data loaded from the ROM 102 or the HDD 104).

Additionally, the RAM 103 has a work area to be used when the CPU 101 performs the various processing. The RAM 103 can appropriately provide various areas.

The HDD 104 is an example of a device capable of storing large-capacity information. In the HDD 104, e.g., an OS (Operating System) is stored. In the HDD 104, information (a computer program or data) for causing the CPU 101 to perform and control the various processing is stored. When loaded to the RAM 103 under the control of the CPU 101, the computer program or data stored in the HDD 104 becomes a target of processing by the CPU 101.

Note that, in addition to (or instead of) the HDD 104, a medium (recording medium) and a drive device (device that reads and writes the computer program and data from and to the medium) may also be provided. Known examples of such a medium include a flexible disk (FD), a CD-ROM, a DVD, a USB (Universal Serial Bus) memory, a MO (magnetooptic disk), a flash memory, and the like.

The hardware configuration of the user terminal 100 is not limited to the configuration illustrated in FIG. 1A, and the configuration illustrated in FIG. 1A can appropriately be transformed of modified.

In the first embodiment, the user terminal 100 is communicatively connected to an external device including a plurality of configurations (an HMD 106, a microphone 107, a speaker 108, and a controller 109). However, the user terminal 100 may also have any or all of functions of the external device. For example, in FIG. 1A, the HMD 106 and the user terminal 100 are provided as separate devices, but the HMD 106 and the user terminal 100 may also be integrated to configure the one user terminal 100.

The HMD 106 is a display device to be worn on a head region of a user. The HMD 106 display a virtual space (VR space). The HMD 106 has various internal sensors for sensing an inclination of the HMD 106 and a line of sight of the user. The microphone 107 receives a sound (such as voice of the user). The speaker 108 outputs a sound. The HMD 106 and the speaker 108 can make various notifications to the user, and can therefore be referred to also as a combined notification device.

The controller 109 receives an input from the user. The input from the user is used to move an avatar in a virtual space or control a UI (User Interface) displayed in the virtual space.

FIG. 1B illustrates an example of a hardware configuration of the server 211. The server 211 is an information processing device for controlling the operation of the user terminal 100. The server 211 has a CPU 201, a ROM 202, a RAM 203, and a HDD 204, similarly to the user terminal 100. Note that these configurations are connected to be communicative with each other via a bus 205. Meanwhile, to the server 211, the HMD 106, the microphone 107, the speaker 108, the controller 109, and the like are not connected.

FIG. 1C illustrates an example of functional configurations of the user terminal 100 and the server 211. The user terminal 100 includes an input/output unit 112 and a transmission/reception unit 113. The server 211 includes a data control unit 213, a transmission/reception unit 214, a determination unit 215, a control unit 218, and a notification unit 219. The data control unit 213 has a conversion unit 216 and a recording unit 217.

The individual functional units of the user terminal 100 and the server 211 each illustrated in FIG. 1C may be implemented by hardware, or may also be implemented by software (a computer program). When each of the functional units is implemented by software, as a computer device capable of executing the computer program, the user terminal 100 and the server 211 each described above can be used.

The input/output unit 112 receives data from the configurations (the HMD 106, the microphone 107, the speaker 108, and the controller 109) connected to the user terminal 100 and outputs the data to the external device.

The transmission/reception unit 113 transmits the data held by the user terminal 100 to the other user terminal 100 via a network 110. The transmission/reception unit 113 also receives the data transmitted from the other user terminal 100 via the network 110.

The transmission/reception unit 214 transmits the data held by the server 211 to the user terminal 100 via the network 110. The transmission/reception unit 214 also receives the data transmitted from the user terminal 100 via the network 110.

The determination unit 215 determines a "top-priority sound source" from among sound sources (avatars) of a plurality of sound data items (a plurality of sound data items addressed to the avatar) simultaneously directed at the avatar linked to the user terminal 100. The "top-priority sound source" mentioned herein is a sound source of a sound to be preferentially conveyed to the user over another sound (voice). Respective sound (voice) generation timings (generation periods) of the plurality of sound data items overlap each other.

The conversion unit 216 converts, to a text data item, the sound data item from the sound source which was not determined to be the "top-priority sound source" by the determination unit 215.

The recording unit 217 records the sound data item of the sound source which was not determined to be the "top-priority sound source" by the determination unit 215.

The control unit 218 controls the user terminal 100 such that the text data item resulting from the conversion by the conversion unit 216 is displayed in the virtual space. Alternatively, the control unit 218 controls the user terminal 100 such that reproduction of the sound data item recorded in the recording unit 217 is started.

The notification unit 219 notifies the user terminal 100 having output the sound data item that the sound data item was converted by the data control unit 213 or the sound data item is recorded.

In the first embodiment, the n user terminals 100 from a first user terminal 100-1 used by a first user to an n-th (n>2) user terminal **100-*n* used by an n-th user are connected to the network 110. Note that each of configurations of the n-th user terminal 100-*n* and configurations connected to an input/output unit 112-*n* of the n-th user terminal 100-*n*** will be described with "-*n*" added to the end thereof. For example, the input/output unit 112 of the n-th user terminal **100-*n* will be referred to as the "input/output unit 112-*n*", while the transmission/reception unit 113 of the n-th user terminal 100-*n* will be referred to as the "transmission/reception unit 113-*n*". For example, the HMD 106 connected to the input/output unit 112-*n* will be referred to as the "HMD 106-*n*", while the speaker 108 connected to the input/output unit 112-*n* will be referred to as the "speaker 108-*n***".

Referring to FIGS. 2A to 4B and FIG. 5, a description will be given of processing in a case where the first user of the first user terminal 100-1 and a second user of a second user terminal 100-2 speak to a third avatar linked to a third user terminal 100-3. In this case, in the virtual space, a first avatar and a second avatar speak to the third avatar, and therefore the first avatar and the second avatar are the sound sources of the sound data items.

Figure 2A:
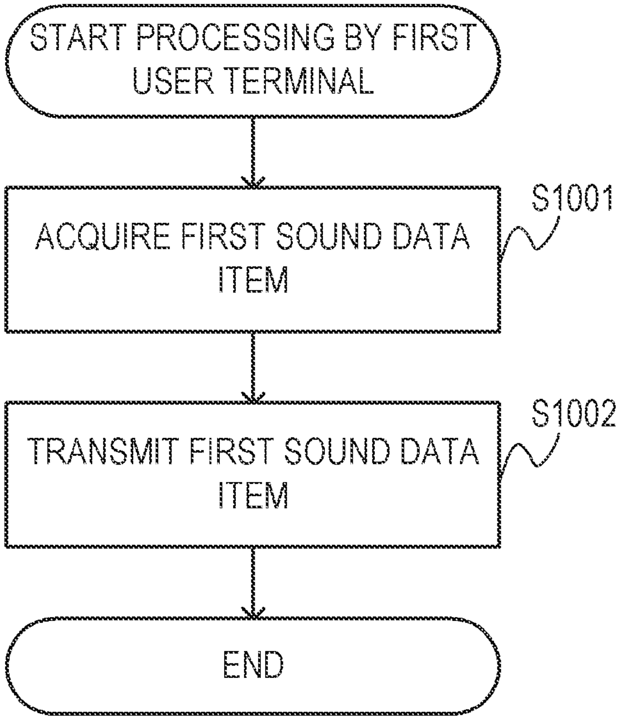
FIGS. 2A and 2B are flow charts illustrating acquisition of sound data items.
Figure 2B:
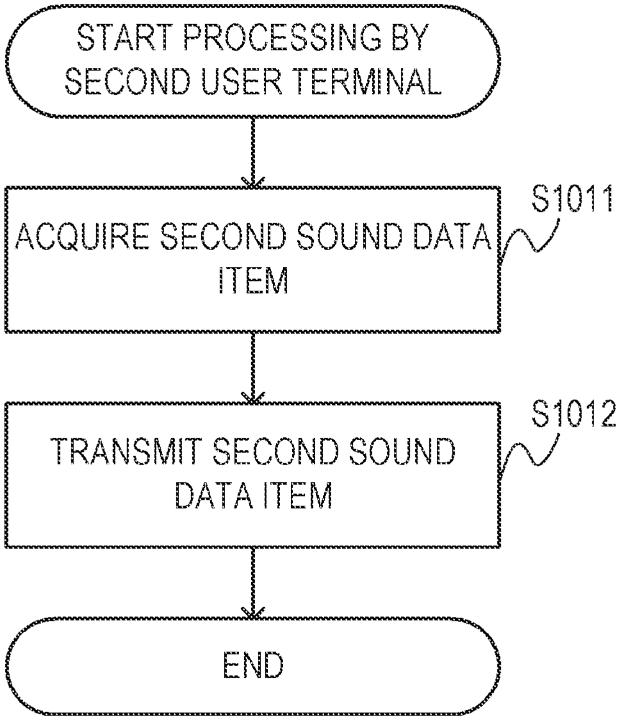
Figure 3:
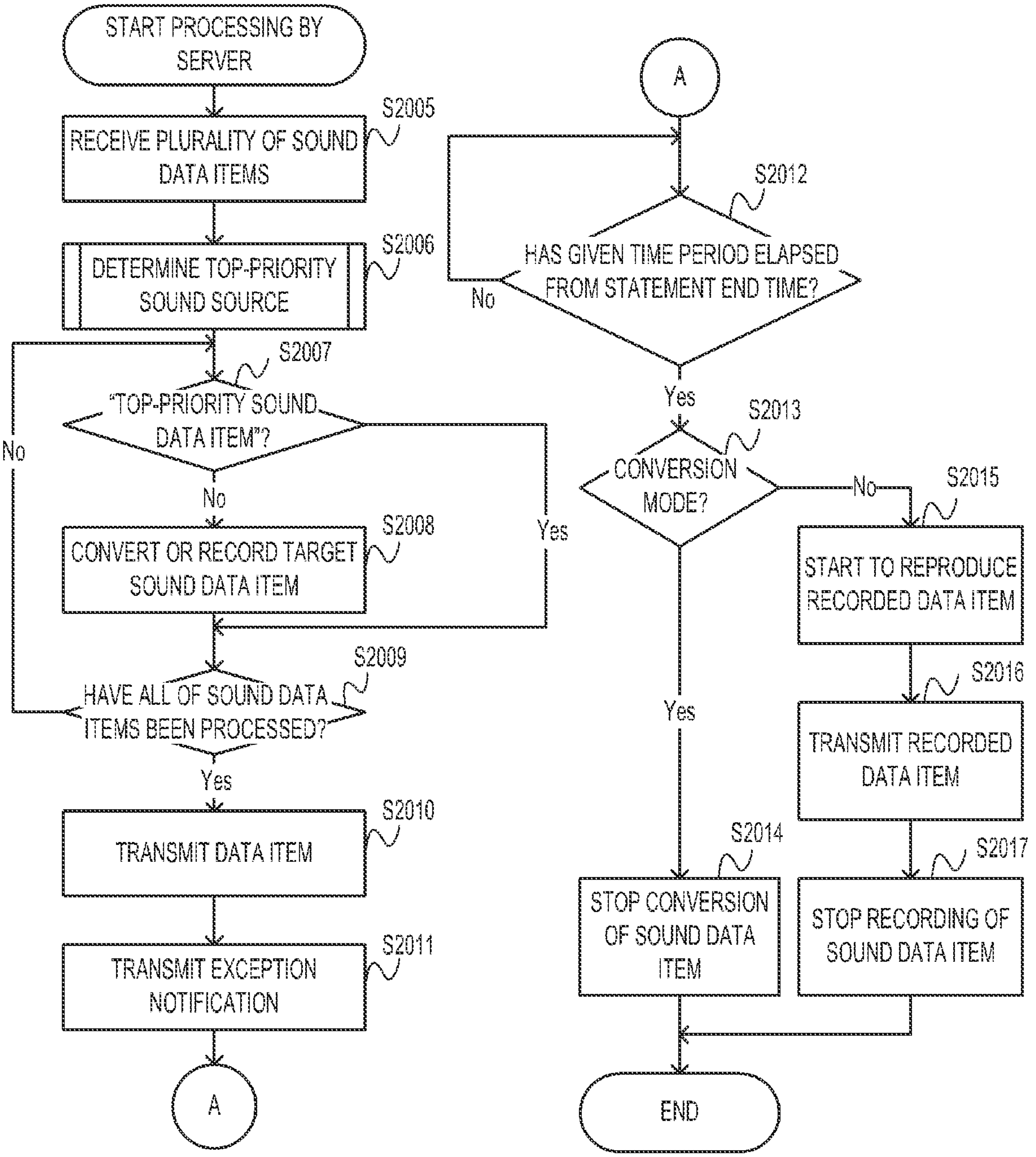
FIG. 3 is a flow chart illustrating processing by the server.

First, referring to FIGS. 2A and 2B, a description will be given of the processing until the two sound data items are transmitted to the server 211.

(Processing by First Information Processing Device): A flow chart in FIG. 2A illustrates processing by the first user terminal 100-1. When the microphone 107-1 receives voice, processing in Step S1001 is started.

In Step S1001, the input/output unit 112-1 acquires, from the microphone 107-1, data on voice uttered by the first user toward the third avatar as a first sound data item.

In step S1002, the transmission/reception unit 113-1 transmits (provides) the first sound data item to the server 211.

(Processing by Second Information Processing Device): A flow chart in FIG. 2B illustrates processing by the second user terminal 100-2. When a microphone 107-2 receives voice, processing in Step S1011 is started.

In Step S1011, an input/output unit 112-2 acquires, from the microphone 107-2, data on voice uttered by the second user toward the third avatar as a second sound data item. Note that sound generation timings of the first sound data item and the second sound data item overlap each other.

In Step S1012, the transmission/reception unit 113-2 transmits (provides) the second sound data item to the server 211.

(Processing by Server): Next, with reference to a flow chart in FIG. 3, processing by the server 211 will be described. When the plurality of sound data items are transmitted to the server 211, processing in Step S2005 is started. Note that, in a case where only one sound data item is transmitted to the server 211, the server 211 does not perform the processing in the flow chart, but transmits the one sound data item to the third user terminal 100-3 in real time. Alternatively, when only one sound data item is transmitted to the server 211, the server 211 may also handle the one sound data item as a sound data item from the "top-priority sound source" and perform the processing in the flow chart in FIG. 3.

In Step S2005, the transmission/reception unit 214 receives the first sound data item and the second sound data item.

In Step S2006, the determination unit 215 determines the "top-priority sound source" from among the sound sources (the first avatar and the second avatar) of the plurality of sound data items (the first sound data item and the second sound data item) directed at the third avatar linked to the third user terminal 100-3. Details of processing in Step S2006 will be described later by using a flow chart in FIG. 5.

Hereinbelow, processing in Steps S2007 and S2008 is performed with respect to each of the sound data items directed at the third avatar (i.e., with respect to each of the first sound data item and the second sound data item). The sound data items on which the processing in Steps S2007 and S2008 is to be performed is referred to as "target sound data items".

In Step S2007, the data control unit 213 determines whether or not each of the target sound data items is the sound data item (hereinafter referred to as the "top-priority sound data item") from the "top-priority sound source". When the target sound data item is determined to be the "top-priority sound data item", the processing in Step S2008 is not performed, and process advances to Step S2009. When the target sound data item is determined to be a sound data item (hereinafter referred to as the "non-priority sound data item") from a "non-top-priority sound source", process advances to Step S2008.

In Step S2008, the data control unit 213 determines to which one of a conversion mode and a recording mode a control mode for the third avatar has been set. When it is determined that the control mode has been set to the conversion mode, the conversion unit 216 converts the target sound data item to the text data item. When it is determined that control mode has been set to the recording mode, the recording unit 217 starts to record the target sound data item. It may also be possible that a third user can optionally set the control mode. Note that the conversion or recording of the target sound data item by the conversion unit 206 continues as long as the target sound data item continues to be transmitted to the server 211.

In Step S2009, the data control unit 213 determines whether or not all of the sound data items (all of the sound data items directed at the third avatar) have been processed by Steps S2007 and S2008. When it is determined that all of the sound data items have been processed, the flow advances to Step S2010. When it is determined that at least one of all the sound data items has not been processed, the flow advances to Step S2007, and the processing in Steps S2007 to S2008 is performed on the unprocessed sound data item.

In Step S2010, the control unit 218 transmits the "top-priority sound data item" to the third user terminal 100-3 via the transmission/reception unit 214. When the one or plurality of sound data items have been converted to the text data items in Step S2008, the control unit 218 transmits the one or plurality of text data items to the third user terminal 100-3.

In Step S2011, the notification unit 219 transmits, via the transmission/reception unit 214, an exception notification indicating that "the sound data item or items have been converted or recorded" to the user terminal 100 linked to the sound sources of the data item or items processed in Step S2008. A description will be given below on the assumption that the second sound data item has been converted or recorded. In this case, the exception notification indicating that "the sound data item has been converted or recorded" is transmitted to the second user terminal 100-2.

In Step S2012, the data control unit 213 determines whether or not a given time period has elapsed from a time (statement end time) when a statement (speaking: generation of a sound) corresponding to the "top-priority sound data item" directed at the third avatar ended. When it is determined that the given time period has elapsed from the statement end time, the flow advances to Step S2013. When it is determined that the given time period has not elapsed from the statement end time, the processing in Step S2012 is repeated.

In Step S2013, the control unit 218 determines to which one of the conversion mode and the recording mode the control mode has been set. When it is determined that the control mode has been set to the conversion mode, the flow advances to Step S2014. When it is determined that the control mode has been set to the recording mode, the flow advances to Step S2015.

In Step S2014, the conversion unit 216 stops the conversion from the sound data item to the text data item.

In Step S2015, the control unit 218 starts to transmit the sound data item recorded by the recording unit 217 to the third user terminal 100-3 via the transmission/reception unit 214. Thus, the control unit 218 controls the third user terminal 100-3 such that the reproduction of the sound data item (non-priority sound data item) recorded by the recording unit 217 is started.

In Step S2016, the transmission/reception unit 214 (control unit 218) continues to transmit the recorded sound data item to the third user terminal 100-3 until the reproduction of the sound data item in the third user terminal 100-3 is completed.

In Step S2017, the recording unit 217 stops the recording of the sound data item.

Figure 4A:
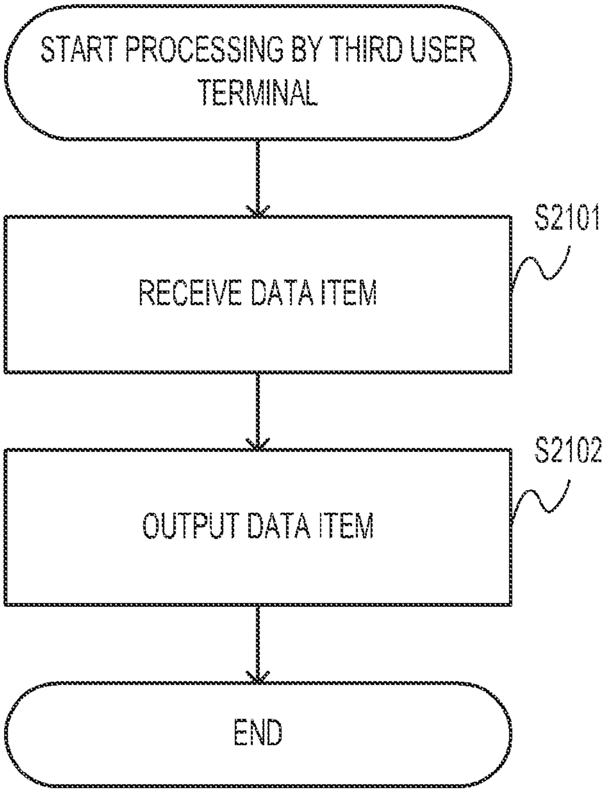
FIGS. 4A and 4B are flow charts illustrating outputting of a data item.

Referring to a flow chart in FIG. 4A, processing of causing the third user terminal 100-3 to notify the third user of contents of a statement indicated by the sound data item will be described. When the data item (the sound data item or the text data item) is transmitted to the third user terminal 100-3, processing in Step S2101 is started.

In Step S2101, the transmission/reception unit 113-3 receives the data items transmitted from the server 211.

In Step S2102, the input/output unit 112-3 outputs, from among the data items received in Step S2101, the sound data item to the speaker 108-3, while outputting the text data item to the HMD 106-3. As a result, the sound data item is reproduced from the speaker 108-3. On the HMD 106-3, a character indicated by the text data item is displayed. In other words, what is indicated by the sound data item is reported by voice to the third user, while what is indicated by the text data item is reported by text display to the third user.

Consequently, the processing in the present flow chart is started at timing at which the data item is transmitted to the third user terminal 100-3 in Step S2010 and at timing at which the data item is transmitted to the third user terminal 100-3 in Step S2016. As a result, for the data item transmitted in Step S2010, what was stated is reported in real time (without delay from the timing of generation of the voice directed at the third avatar) to the third user. Meanwhile, for the data item transmitted in Step S2016, what was stated is reported to the third user behind real time (after the reproduction of the top-priority sound data item is ended).

Figure 4B:
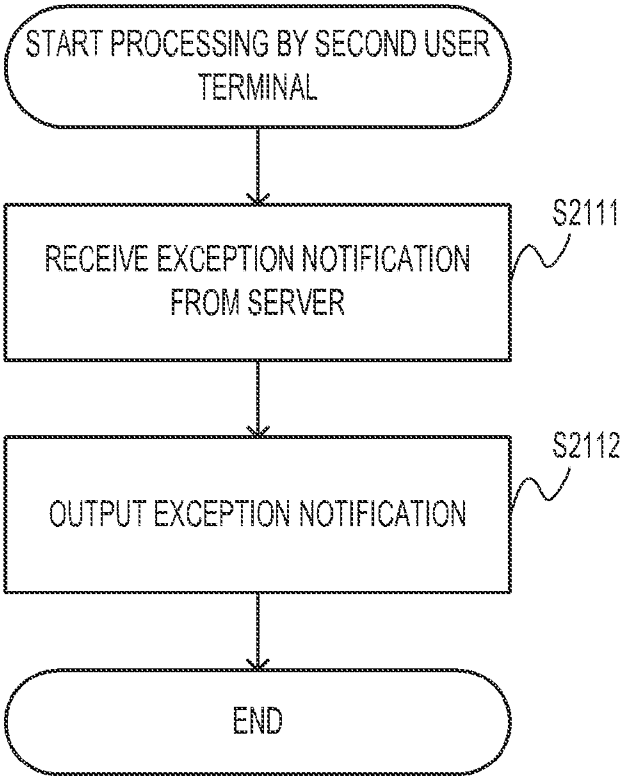
Figure 5:
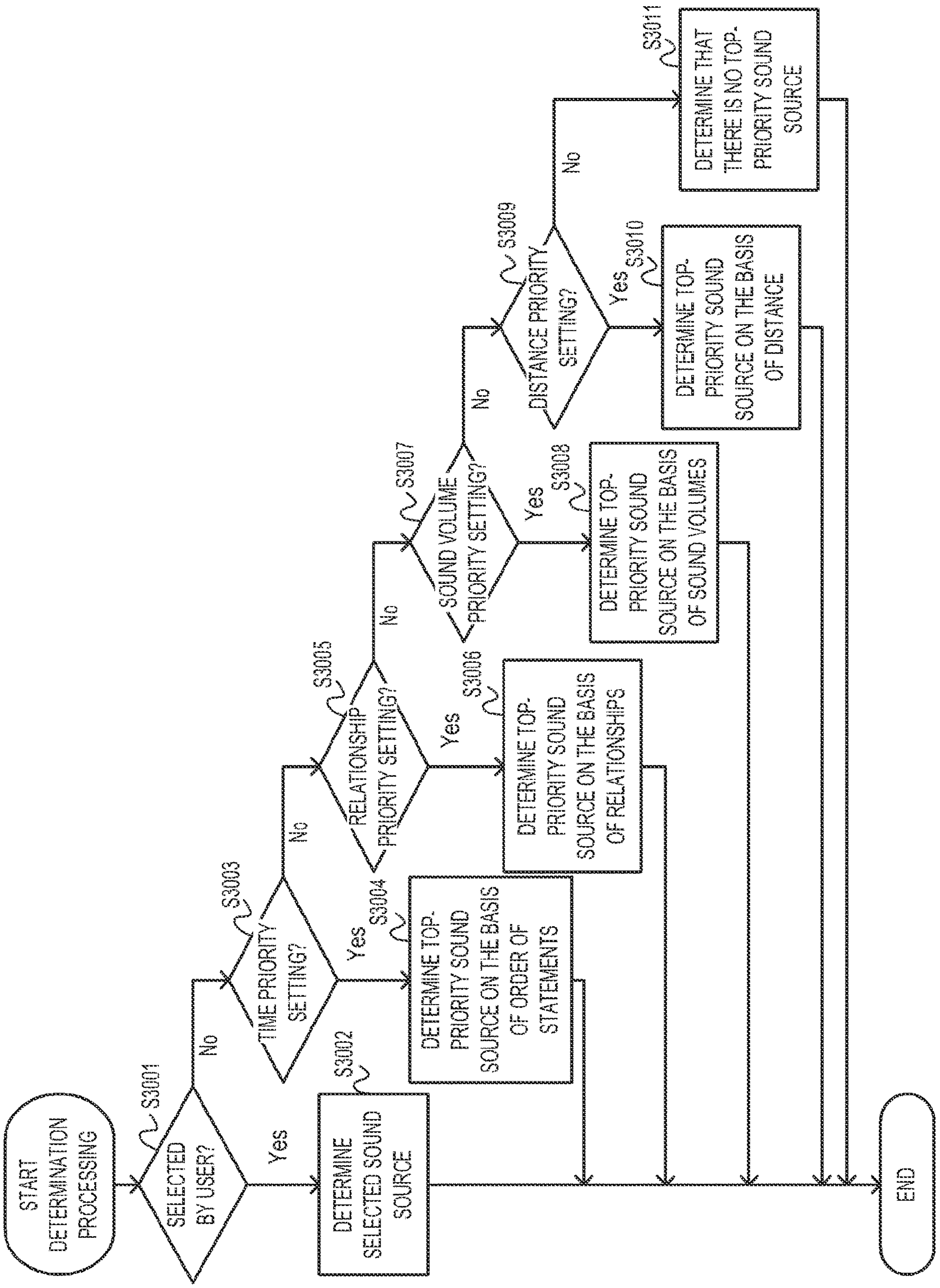
FIG. 5 is a flow chart illustrating determination of a top-priority sound source.

Referring to a flow chart in FIG. 4B, processing (processing by the second user terminal 100-2) of notifying the second user that "the sound data item of a statement by the second user has been recorded or converted" will be described. When the exception notification is transmitted from the server 211 to the second user terminal 100-2, processing in Step S2111 is started.

In Step S2111, the transmission/reception unit 113-2 receives the exception notification transmitted from the server 211 in Step S2011.

In Step S2112, the input/output unit 112-2 outputs the exception notification received in Step S2111 to the HMD 106-2. Thus, the HMD 106-2 performs display based on the notification. The input/output unit 112-2 may also output the exception notification received in Step S2111 to the speaker 108-2. Thus, the speaker 108-2 reproduces the sound data item based on the notification.

For example, when receiving the exception notification indicating that the sound data item has been converted, the HMD 106-2 displays a character or the like indicating that the sound data item has been converted to the text data item (a notification is made by text). This allows the second user to recognize that contents of voice uttered thereby have been reported to the third user not by voice, but by text.

Alternatively, for example, when receiving the exception notification indicating that the sound data item has been recorded, the HMD 106-2 displays a character or the like indicating that the sound data item has been recorded (reported in delay). This allows the second user to recognize that the third user was notified by voice of contents of the voice uttered thereby not in real time, but behind real time.

Note that, when receiving the exception notification, the HMD 106-2 may also notify the second user that "the third user was not notified by voice of the sound data item in real time" irrespective of a type of the exception notification.

(Step S2006): Next, referring to a flow chart in FIG. 5, a description will be given of determination processing performed in Step S2006. It is possible herein to subject each of the user terminals 100 to terminal setting for determining, from among the plurality of sound sources, the "top-priority sound source". For example, the terminal setting is any of the following time priority setting, relationship priority setting, sound volume priority setting, and distance priority setting.

Figure 7A:
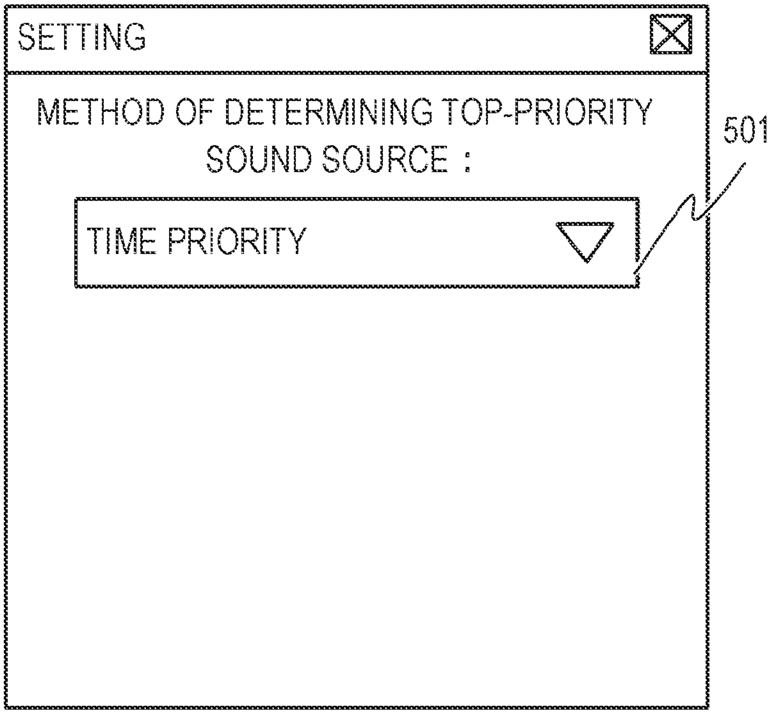
FIGS. 7A and 7B are diagrams illustrating terminal setting.

FIG. 7A illustrates a setting screen displayed on the user terminal 100. A drop-down list 501 represents a method of determining the "top-priority sound source" to be referenced in determination processing performed in Step S2006. In an example in FIG. 7A, the current terminal setting is the time priority setting.

Figure 7B:
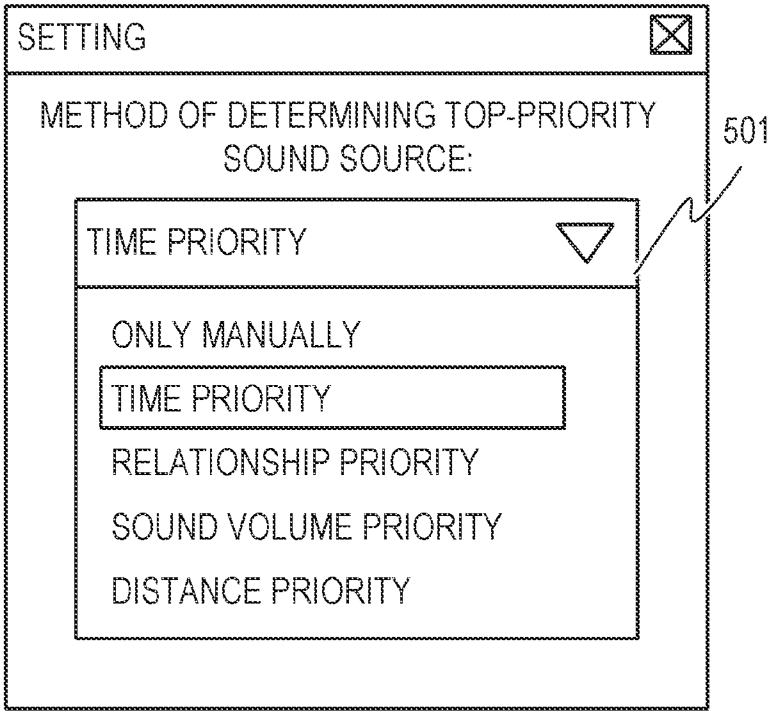

FIG. 7B illustrates a state where the drop-down list 501 has been opened by a user operation performed in a state in FIG. 7A. The user can determine, as the terminal setting, the setting of any of a time priority, a relationship priority, a sound volume priority, and a distance priority. Meanwhile, the user can also make setting which allows the "top-priority sound source" to be determined by using only a method selected by the user (only manually).

In Step S3001, the determination unit 215 determines whether or not the "top-priority sound source" has been selected (manually) by the third user in the third user terminal 100-3. When it is determined that the "top-priority sound source" has been selected by the third user, process advances to Step S3002. When it is determined that the "top-priority sound source" has not been selected by the third user, process advances to Step S3003.

In Step S3002, the determination unit 215 determines, as the "top-priority sound source", the sound source selected in Step S3001.

In Step S3003, the determination unit 215 determines whether or not the setting of the third user terminal 100-3 (terminal setting) is the time priority setting. When it is determined that the terminal setting is the time priority setting, process advances to Step S3004. When it is determined that the terminal setting is not the time priority setting, process advances to Step S3005.

In Step S3004, the determination unit 215 determines the "top-priority sound source" on the basis of an order of statements (generation of sounds) corresponding to the sound data items. Specifically, the determination unit 215 determines the sound source of the sound data item that started to be uttered at an earliest time from among the sound data items directed at the third avatar to be the "top-priority sound source". For example, when a second person starts to speak to the third avatar in a state where a first person is speaking to the third avatar, the avatar of the first person is determined to be the "top-priority sound source". Alternatively, the determination unit 215 may also determine the sound source of the sound data item that started to be uttered at a latest time from among the sound data items directed at the third avatar to be the "top-priority sound source".

In Step S3005, the determination unit 215 determines whether or not the setting (terminal setting) of the third user terminal 100-3 is the relationship priority setting. When it is determined that the terminal setting is the relationship priority setting, the flow advances to Step S3006. When it is determined that the terminal setting is not the relationship priority setting, the flow advances to Step S3007.

In Step S3006, the determination unit 215 determines the "top-priority sound source" from among the sound sources of the plurality of sound data items on the basis of relationships between the sound sources of the plurality of sound data items directed at the third avatar and the third avatar. For example, while an avatar of an instructor is talking in a lecture, when the third avatar is spoken to by an avatar of a student next thereto, it is highly possible that, during the lecture, a statement by the avatar of the instructor is more important to the third avatar than a statement by the avatar of the next student. Accordingly, the determination unit 215 determines the avatar of the instructor to be the "top-priority sound source".

In Step S3007, the determination unit 215 determines whether or not the setting (terminal setting) of the third user terminal 100-3 is the setting of the sound volume priority. When it is determined that the terminal setting is the sound volume priority setting, the flow advances to Step S3008. When it is determined that the terminal setting is not the sound volume priority setting, the flow advances to Step S3009.

In Step S3008, the determination unit 215 determines the "top-priority sound source" from among the sound sources of the plurality of sound data items on the basis of sound volumes of the plurality of sound data items directed at the third avatar. For example, the determination unit 215 determines, from among the sound sources of the plurality of sound data items, the sound source of the sound data item having the largest sound volume to be the "top-priority sound source". For example, when an urgent matter is to be conveyed, loud voice is used in most cases. Accordingly, by determining the sound source of the sound data item having the largest sound volume to be the "top-priority sound source", it is possible to preferentially convey voice including the urgent matter to the third user.

In Step S3009, the determination unit 215 determines whether or not the setting (terminal setting) of the third user terminal 100-3 is the distance priority setting. When it is determined that the terminal setting is the distance priority setting, the flow advances to Step S3010. When it is determined that the terminal setting is not the distance priority setting, the flow advances to S3011.

In Step S3010, the determination unit 215 determines the "top-priority sound source" from among the sound sources of the plurality of sound data items directed at the third avatar on the basis of distances between the sound sources of the sound data items directed at the third avatar and the third avatar. For example, the determination unit 215 determines, from among the sound sources of the plurality of sound data items, the sound source at a longest distance to the third avatar to be the "top-priority sound source". For example, when an urgent matter is to be conveyed, voice may be generated even at a position distant from the third avatar in order to convey the urgent matter. Accordingly, by determining the sound source at the longest distance to the third avatar to be the "top-priority sound source", it is possible to preferentially convey the voice including the urgent matter to the third user. Alternatively, the determination unit 215 may also determine that the avatar (sound source) at a shortest distance to the third avatar is closest to the third avatar, and determine the sound source at the shortest distance to the third avatar to be the "top-priority sound source".

In Step S3011, the determination unit 215 determines that the "top-priority sound source" is not present. Note that, in Step S3011, the determination unit 215 may also calculate respective priorities of the plurality of sound sources on the basis of at least two of, e.g., the order of statements, the relationships with the third avatar, the distances to the third avatar, and the sound volumes of the plurality of sound data items. Then, the determination unit 215 may also determine the sound source with the high priority to be the "top-priority sound source".

Next, referring to FIGS. 6A to 6C, a description will be given of operations of the user terminal 100 and the server 211.

Figure 6A:
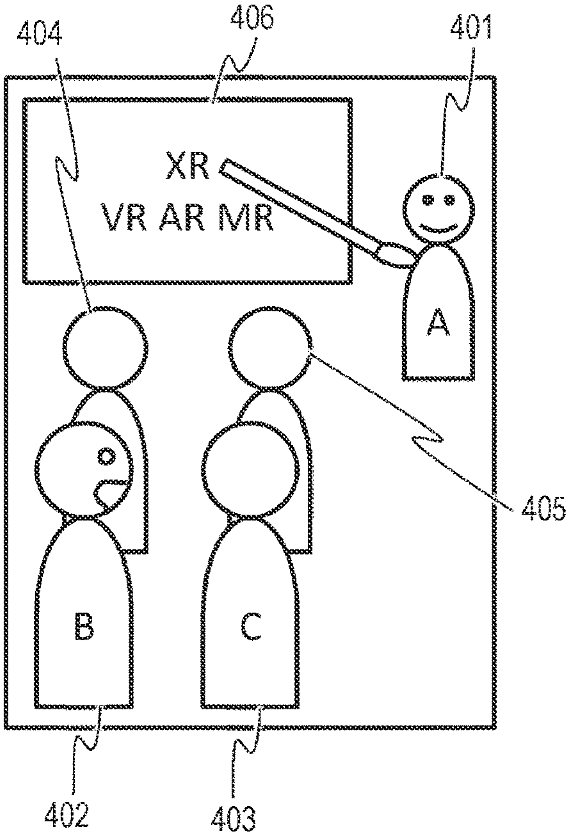
FIGS. 6A to 6C are diagrams illustrating operations of the user terminal and the server.

FIG. 6A illustrates the virtual space in which a presentation is performed. A first avatar 401 is an avatar controlled by the first user of the first user terminal 100-1. Likewise, a second avatar 402 is an avatar controlled by the second user of the second user terminal 100-2. A third avatar 403 is an avatar controlled by the third user of the third user terminal 100-3. A fourth avatar 404 is an avatar controlled by a fourth user of the fourth user terminal 100-4. A fifth avatar 405 is an avatar controlled by a fifth user of the fifth user terminal 100-5.

Characters in bodies of the individual avatars represent names of the avatars. The first avatar 401 is a presenter of the presentation. The first avatar 401 is explaining a presentation material 406 displayed in the virtual space. The second to fifth avatars 402 to 405 are presentation participants, and are listening to the explanation by the first avatar 401. The second avatar 402 who faces a direction in which the third avatar 403 is located is about to speak to the third avatar 403.

Figure 6B:
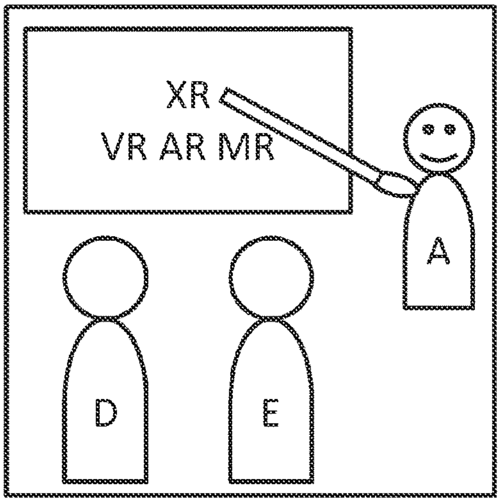

FIG. 6B illustrates an image (image of the virtual space) displayed on the HMD 106-3 of the third user 100-3 in a state in FIG. 6A. In a state illustrated in FIG. 6B, only the first user is speaking to the third avatar 403, and accordingly voice of a statement by the first user is coming from the speaker 108-3.

Figure 6C:
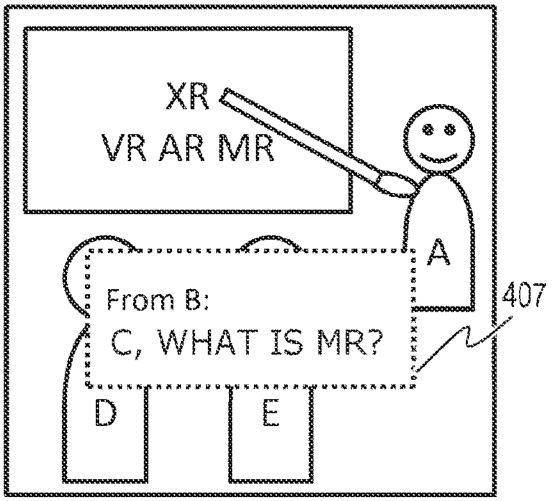

FIG. 6C illustrates an image displayed on the HMD 106-3 when the second avatar 402 speaks to the third avatar 403 in the state in FIG. 6A. In other words, a state illustrated in FIG. 6C is a state where the second user is speaking, together with the first user, to the third avatar 403. Accordingly, the voice of the statement by the first avatar 401 (first user) corresponding to the "top-priority sound source" is coming from the speaker 108-3. Meanwhile, what was stated by the second avatar 402 to the third avatar 403 corresponding to the "non-top-priority sound source" is displayed in a broken line region 407. What was stated by the second avatar 402 is displayed by text on the HMD 106-3.

Hereinbelow, a flow of processing by a specific example when the control mode is the conversion mode will be described.

(1) The first user utters voice saying "XR is" to the microphone 107-1. Then, the input/output unit 112-1 acquires data on the voice saying "XR is" as the first sound data item (Step S1001). Subsequently, the transmission/reception unit 113-1 transmits the first sound data item to the server 211 (Step S1002).

(2) Meanwhile, the second user utters voice saying "Mr. or Mis. C, what is MR?" to the microphone 107-2. Then, the input/output unit 112-1 acquires data on the voice saying "Mr. or Mis. C, what is MR?" as the second sound data item (Step S1011). Subsequently, the transmission/reception unit 113-2 transmits the second sound data item to the server 211 (Step S1012). It is assumed that processing in (1) and processing in (2) is substantially simultaneously performed.

(3) The transmission/reception unit 214 receives the first sound data item and the second sound data item (Step S2005).

(4) The determination unit 215 determines the "top-priority sound source" from among the sound source (first avatar 401) of the first sound data item and the sound source (second avatar 402) of the second sound data item (Step S2006).

Specifically, first, the determination unit 215 determines whether or not the "top-priority sound source" has been selected by the third user (Step S3001). It is assumed herein that a state where the "top-priority sound source" has not been selected by the third user and the terminal setting of the third user termina 100-3 is the time priority setting (state in FIG. 7A) is established. Then, the determination unit 215 determines that the "top-priority sound source" has not been selected by the third user (Step S3001 No), and then determines that the terminal setting is the time priority setting (S3003 Yes).

Then, the determination unit 215 determines the sound source of the sound data item uttered earliest by the third avatar 403 linked to the third user terminal 100-3 to be the "top-priority sound source" (Step S3004). In the present example, among the first sound data item of "XR is" and the second sound data item of "Mr. or Mis. C, what is MR?", the first sound data item is assumed to be the sound data item uttered earliest to the third avatar 403. In other words, the determination unit 215 determines the first avatar 401 corresponding to the sound source of the first sound data item to be the "top-priority sound source".

(5) The data control unit 213 determines whether or not the first sound data item is the "top-priority sound data item" (Step S2007). Then, the first sound data item is determined to be the "top-priority sound data item" (Step S2007 Yes).

(6) The conversion unit 216 determines whether or not all of the sound data items (the first sound data item and the second sound data item) directed at the third avatar 403 have been processed (Step S2009).

(7) Since the second sound data item has not been processed (Step S2009 No), the conversion unit 216 determines whether or not the second sound data item is the "top-priority sound data item" (Step S2007).

(8) Since the second sound data item is not the "top-priority sound data item" (Step S2007 No), the conversion unit 216 converts the second sound data item ("Mr. or Mis. C, what is MR?") of the "non-top-priority sound source" to the text data item (Step S2008). The conversion of the sound data item to the text data item can be implemented by using an exiting speech recognition technique.

(9) The conversion unit 216 determines whether or not all of the sound data items directed at the third avatar 403 have been processed (Step S2009). It is determined herein that all of the sound data items have been processed (Step S2009 Yes).

(10) The control unit 218 transmits, via the transmission/reception unit 214, the first sound data item from the "top-priority sound source" and the text data item ("Mr. or Mis. C, what is MR?") from the "non-top-priority sound source" to the third user terminal 100-3 (Step S2010). Thus, the control unit 218 performs control of reproduction of the first sound data item from the "top-priority sound source" and control of display of the text data item from the "non-top-priority sound source".

(11) The transmission/reception unit 113-3 receives the sound data item (top-priority sound data item) and the text data item each transmitted from the server 211 (Step S2101). The transmission/reception unit 113-3 receives herein the first sound data item and the text data item of ("Mr. or Mis. C, what is MR?").

(12) The input/output unit 112-3 outputs the received data items to the speaker 108-3 or the HMD106-3 (Step S2102). The input/output unit 112-3 outputs herein the first sound data item to the speaker 108-3, while outputting the text data item to the HMD 106-3. At this time, on the HMD 106-3, the image illustrated in FIG. 6B changes to the image illustrated in FIG. 6C.

(13) The transmission/reception unit 214 transmits the exception notification indicating that the sound data item has been converted to the second user terminal 100-2 linked to the second avatar 402 corresponding to the sound source of ("Mr. or Mis. C, what is MR?") (Step S2011).

(14) The transmission/reception unit 113-2 receives the exception notification transmitted from the server 211 (Step S2111). The transmission/reception unit 113-2 receives herein the exception notification indicating that the sound data item from the second avatar 402 has been converted to the text data item.

(15) The input/output unit 112-2 outputs the received exception notification to the speaker 108-2 or to the HMD 106-2 (Step S2112). The input/output unit 112-2 outputs, to the HMD 106-2, the exception notification indicating that, e.g., the sound data item from the second avatar 402 has been converted to the text data item.

(16) The conversion unit 216 determines whether or not a given time period has elapsed from an end time (statement end time) of the statement corresponding to the "top-priority sound data item" (Step S2012).

(17) After the given time period has elapsed from the statement end time (Step S2012 Yes), the control unit 218 determines whether or not the control mode is the conversion mode (Step S2013).

(18) Since the control mode is the conversion mode (Step S2013 Yes), the conversion unit 216 stops the conversion of the sound data item (Step S2014).

Thus, according to the foregoing (1) to (18), the server 211 converts the sound data item (non-priority sound data item) from the "non-top-priority sound source" to the text data item. Then, the server 211 outputs the sound data item (top-priority sound data item) from the "top-priority sound source" as the sound data item to the speaker 108-3 without alteration. Meanwhile, the sound data item from the "non-top-priority sound source" is output as the text data item to the HMD 106-3. As a result, even in a situation in which statement timings of a plurality of persons overlap each other in the virtual space, the user can recognize what was stated by one of the persons in real time on the basis of voice (a sound which allows the intent of a speaker to be easily recognized through a manner of saying and a tone of voice). In addition, the user can also recognize what was stated by another person by text.

The foregoing description has been given of the case where the control mode is the conversion mode. A description will be given below of a case where the control mode is the recording mode. The foregoing processing in (1) to (7) is the same as in the description given above, and therefore a description thereof is omitted.

(8') The recording unit 217 starts to record the second sound data item from the "non-top-priority sound source" (Step S2008).

(9') The recording unit 217 determines whether or not all of the sound data items directed at the third avatar 403 have been processed (step S2009).

(10') Since all of the sound data items have been processed (Step S2009 Yes), the control unit 218 transmits, via the transmission/reception unit 214, the "top-priority sound data item" (the first sound data item of "XR is" to the third user terminal 100-3 (Step S2010).

(11') The transmission/reception unit 113-3 receives the sound data item transmitted from the server 211 (Step S2101). The first sound data item of "XR is" is received herein.

(12') The input/output unit 112-3 outputs the received data item to the speaker 108-3 (Step S2102). In other words, the input/output unit 112-3 outputs the first sound data item of "XR is" to the speaker 108-3.

(13') The transmission/reception unit 214 transmits the exception notification indicating that the sound data item has been recorded to the second user terminal 100-2 liked to the second avatar 402 corresponding to the sound source of the processed second sound data item (Step S2011).

(14') The transmission/reception unit 113-2 receives the exception notification transmitted from the server 211 (Step S2111).

(15') The input/output unit 112-2 outputs the exception notification received in Step S2111 to the HMD 106-2 (Step S2112). The exception notification indicating that the sound data item from the second avatar 402 has been recorded is output herein to the HMD 106-2.

(16') The recording unit 217 determines whether or not a given time period has elapsed from a time (statement end time) at which a statement corresponding to the "top-priority sound data item" was ended (Step S2012).

(17') After the given time period elapsed from the statement end time (Step S2012 Yes), the control unit 218 determines whether or not the control mode has been set to the conversion mode (Step S2013).

(18') The control mode has been set to the recording mode (Step S2013 No). Accordingly, the control unit 218 transmits the sound data item to the third user terminal 100-3 such that the third user terminal 100-3 starts to reproduce the sound data item recorded in the recording unit 217 (Step S2015). The control unit 218 transmits herein the second sound data item to the third user terminal 100-3 such that the third user terminal 100-3 starts to reproduce the second sound data item (sound data item of "Mr. or Mis. C, what is MR?").

(19') The transmission/reception unit 214 continues to transmit the recorded second sound data item (sound data item of "Mr. or Mis. C, what is MR?") to the third user terminal 100-3 until the reproduction of the second sound data item is completed (Step S2016).

(20') The transmission/reception unit 113-3 receives the data item transmitted from the server 211 (Step S2101). The transmission/reception unit 113-3 receives herein the recorded second sound data item (sound data item of "Mr. or Mis. C, what is MR?").

(21') The input/output unit 112-3 outputs the received data item to the speaker 108-3 (Step S2102). The input/output unit 112-3 outputs herein the recorded second sound data item (sound data item of "Mr. or Mis. C, what is MR?") to the speaker 108-3. Consequently, after the reproduction of the first sound data item is ended, the second sound data item is reproduced, and therefore there is no overlap between the two voices in voices heard by the third user. This allows the third user to recognize both of contents of the first sound data item and contents of the second sound data item by voice.

(22') The recording unit 217 stops the recording of the sound data item (Step S2017).

Thus, according to the foregoing (1) to (7) and (8') to (22'), the server 211 records the sound data item from the "non-top-priority sound source". Then, the sound data item from "the top-priority sound source" is reproduced by voice in real time without alteration, while the sound data item from the "non-top-priority sound source" is reproduced by the speaker 108-3 at timing after the sound data item from the "top-priority sound source" was ended. As a result, even in a situation in which statement timings of a plurality of persons overlap each other in the virtual space, the user can check what was stated by one of the persons by voice in real time, and can also separately check what was stated by another person.

In the description given above, the conversion of the sound data item by the conversion unit 216 is stopped when the given time period has elapsed from the statement end time. The conversion of the sound data item may also be stopped by the third user of the third user terminal 100-3 by manually giving an instruction. Likewise, the starting of reproduction of the recorded data item by the control unit 218 and the stopping of recording of the sound data item by the recording unit 217 may also be performed by the third user of the third user terminal 100-3 by manually giving instructions.

With regard to the reproduction of the sound data item (recorded sound data item) by the control unit 218, it may also be possible to display a UI for sound data reproduction on the HMD 106-3 and allow the third user to control a behavior of the speaker 108-3 during sound data reproduction.

In the description given above, the recording unit 217 records the sound data item, but a recording method is not limited only to the recording of the sound data item. Specifically, the recording unit 217 may also record (video-record) a video in the virtual space including the sound data item. Alternatively, after the sound data item was converted to the text data item by the conversion unit 216, the recording unit 217 may also record the text data item.

The foregoing description has been given on the assumption that the avatar linked to the user terminal 100 is the sound source, but the sound source is not limited thereto. The sound source may also be a virtual object (e.g., a virtual speaker that generates a sound) not linked to the user terminal 100 in the virtual space.

In the description given above, a client-server system in which the server 211 is present is used, but it may also be possible to use a peer-to-peer system. In this case, the server 211 is not present, and the user terminal 100 implements the functional configuration and processing of the server 211 in place of the server 211.

According to the present disclosure, when sounds from a plurality of sound sources are directed at an avatar in a virtual space, it is possible to allow a user who controls the avatar to appropriately recognize contents of the sounds.

While the present disclosure has been described in detail on the basis of the preferred embodiments thereof, the present disclosure is not limited to these specific embodiments, and include various modes within a scope not departing from the gist of this disclosure. It may also be possible to combine portions of the embodiments described above as appropriate.

In the foregoing, "when A is equal to or more than B, advance to Step S1 and, when A is smaller (lower) than B, advance to Step S2" may also be read as "when A is larger (higher) than B, advance to Step S1 and, when A is equal to or less than B, advance to Step S2". Conversely, "when A is larger (higher) than B, advance to Step S1 and, when A is equal to or less than B, advance to Step S2" may also be read as "when A is equal to or more than B, advance to Step S1 and, when A is smaller (lower) than B, advance to Step S2". Accordingly, as long as no contradiction arises, "equal to or more than A" may also be read as "larger (higher, longer, or more) than A", while "equal to or less than A" may also be read as "smaller (lower, shorter, less) than A". Additionally, "larger (higher, longer, or more) than A" may also be read as "equal to or more than A", while "smaller (lower, shorter, less) than A" may also be read as "equal to or less than A".

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-022712, filed on Feb. 16, 2023, which is hereby incorporated by reference herein in its entirety.

What is claimed is:

1. An information processing device comprising at least one memory storing instructions; and at least one processor that, upon execution of the stored instructions, is configured to:

obtain, for each of a plurality of users, sound data representing voice uttered by the user;

determine any one of the plurality of users as a priority sound source;

perform control to notify a target user who is not any of the plurality of users of details of priority sound data that is sound data corresponding to the priority sound source by causing, at a first timing, the priority sound data to be audibly reproduced by a target wearable device that is a wearable device worn by the target user;

perform control to notify the target user of details of non-priority sound data that is sound data not corresponding to the priority sound source without causing, at the first timing, the non-priority sound data item to be audibly reproduced by the target wearable device; and perform control to notify, among a plurality of wearable devices respectively worn by the plurality of users not including the target user, a non-priority wearable device worn by a user corresponding to the non-priority sound data, that the non-priority sound data is not audibly reproduced at the first timing, wherein the non-priority wearable device notifies the user wearing the non-priority wearable device that the non-priority sound data is not audibly reproduced at the first timing.

2. The information processing device according to claim 1, wherein execution of the stored instructions further configures the at least one processor to perform control to notify the target user of the details of the non-priority sound data by displaying a character representing the details of the non-priority sound data.

3. The information processing device according to claim 1, wherein execution of the stored instructions further configures the at least one processor to perform control to notify the target user of the details of the non-priority sound data by audibly reproducing the non-priority sound data at a second timing after audibly reproduction of the priority sound data is ended.

4. The information processing device according to claim 1, wherein execution of the stored instructions further configures the at least one processor to determine, as the priority sound source, a user who uttered a voice earliest among the plurality of users.

5. The information processing device according to claim 1, wherein execution of the stored instructions further configures the at least one processor to determine the priority sound source on a basis of a relationship between the plurality of users and the target user.

6. The information processing device according to claim 1, wherein execution of the stored instructions further configures the at least one processor to determine the priority sound source on a basis of volumes of a plurality of voices respectively uttered by a plurality of users.

7. The information processing device according to claim 1, wherein the plurality of users are respectively associated with a plurality of avatars in a virtual space, wherein the target user is associated with an avatar in the virtual space, and wherein execution of the stored instructions further configures the at least one processor to determine the priority sound source on a basis of distances between the plurality of avatars associated with the plurality of users and the avatar associated with the target user in the virtual space.

8. The information processing device according to claim 1, wherein execution of the stored instructions further configures the at least one processor to determine a user selected by the target user from among the plurality users, as the priority sound source.

9. The information processing device according to claim 1, wherein execution of the stored instructions further configures the at least one processor to determine whether a control mode has been set to any one of a conversion mode and a recording mode.

10. The information processing device according to claim 9, wherein, in a case where the control mode has been set to the conversion mode, execution of the stored instructions further configures the at least one processor to perform control to notify the target user of the details of the non-priority sound data by converting the non-priority sound data into text data.

11. The information processing device according to claim 10, wherein execution of the stored instructions further configures the at least one processor to cause, at the first timing, the priority sound data to be audibly reproduced by the target wearable device and cause a character representing the text data to be displayed by the target wearable device.

12. The information processing device according to claim 9, wherein, in a case where the control mode has been set to the recording mode, execution of the stored instructions further configures the at least one processor to start recording the non-priority sound data.

13. The information processing device according to claim 12, wherein, after a given time period has elapsed from a statement end time of the priority sound data, execution of the stored instructions further configures the at least one processor to perform control to notify the target user of the details of the non-priority sound data by causing recorded non-priority sound data corresponding to the non-priority sound data to be audibly reproduced by the target wearable device.

14. The information processing device according to claim 13, wherein execution of the stored instructions further configures the at least one processor to continue transmitting the recorded non-priority sound data to the target wearable device until audible reproduction of the recorded non-priority sound data by the target wearable device is completed.

15. The information processing device according to claim 14, wherein execution of the stored instructions further configures the at least one processor to stop recording the non-priority sound data after the audible reproduction of the recorded non-priority sound data by the target wearable device is completed.

16. The information processing device according to claim 13, wherein execution of the stored instructions further configures the at least one processor to display a user interface for sound data reproduction on the target wearable device and allow the target user to control a behavior of a speaker associated with the target wearable device during audible reproduction of the recorded non-priority sound data.

17. The information processing device according to claim 1, wherein execution of the stored instructions further configures the at least one processor to determine the priority soundsource on a basis of a method of determining the priority soundsource set by the target user, and wherein the method is any one of time priority, relationship priority, sound volume priority, and distance priority.

18. The information processing device according to claim 1, wherein execution of the stored instructions further configures the at least one processor to determine, as the priority soundsource, a user who uttered a voice latest among the plurality of users.

19. An information processing method comprising:

obtaining, for each of a plurality of users, sound data representing voice uttered by the user;

determining any one of the plurality of users as a priority sound source;

performing control to notify a target user who is not any of the plurality of users of details of priority sound data that is sound data corresponding to the priority sound source by causing, at a first timing, the priority sound data to be audibly reproduced by a target wearable device that is a wearable device worn by the target user;

performing control to notify the target user of details of non-priority sound data that is sound data not corresponding to the priority sound source without causing, at the first timing, the non-priority sound data item to be audibly reproduced by the target wearable device; and performing control to notify, among a plurality of wearable devices respectively worn by the plurality of users not including the target user, a non-priority wearable device worn by a user corresponding to the non-priority sound data, that the non-priority sound data is not audibly reproduced at the first timing, wherein the non-priority wearable device notifies the user wearing the non-priority wearable device that the non-priority sound data is not audibly reproduced at the first timing.

20. A non-transitory computer readable medium that stores instructions that, when executed by at least one processor of an information processing apparatus configures the information processing apparatus to execute a method, the method comprising:

obtaining, for each of a plurality of users, sound data representing voice uttered by the user;

determining any one of the plurality of users as a priority sound source;

performing control to notify a target user who is not any of the plurality of users of details of priority sound data that is sound data corresponding to the priority sound source by causing, at a first timing, the priority sound data to be audibly reproduced by a target wearable device that is a wearable device worn by the target user;

performing control to notify the target user of details of non-priority sound data that is sound data not corresponding to the priority sound source without causing, at the first timing, the non-priority sound data item to be audibly reproduced by the target wearable device; and performing control to notify, among a plurality of wearable devices respectively worn by the plurality of users not including the target user, a non-priority wearable device worn by a user corresponding to the non-priority sound data, that the non-priority sound data is not audibly reproduced at the first timing, wherein the non-priority wearable device notifies the user wearing the non-priority wearable device that the non-priority sound data is not audibly reproduced at the first timing.

* * * * *